(12) United States Patent
Chen

(10) Patent No.: US 11,084,702 B2
(45) Date of Patent: Aug. 10, 2021

(54) TEMPERATURE ADJUSTING METHOD FOR INSTANT HEATING OR COOLING WITH AN ENERGY-SAVING WATER DISPENSER AND WATER DISPENSER

(71) Applicant: DONGGUAN UNIVERSITY OF TECHNOLOGY, Guangdong (CN)

(72) Inventor: Baiman Chen, Guangdong (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 45 days.

(21) Appl. No.: 16/377,220

(22) Filed: Apr. 7, 2019

(65) Prior Publication Data

US 2020/0247658 A1 Aug. 6, 2020

(30) Foreign Application Priority Data

Feb. 1, 2019 (CN) .......................... 201910106205.0

(51) Int. Cl.
*B67D 1/08* (2006.01)

(52) U.S. Cl.
CPC ......... *B67D 1/0884* (2013.01); *B67D 1/0862* (2013.01); *B67D 2210/0001* (2013.01); *B67D 2210/00026* (2013.01); *B67D 2210/00118* (2013.01)

(58) Field of Classification Search
CPC .. B67D 1/0862; B67D 1/0884; B67D 1/0858; B67D 2210/00118; B67D 1/0861; A47J 31/465; A47J 1/545
See application file for complete search history.

(56) References Cited

U.S. PATENT DOCUMENTS

| | | | | |
|---|---|---|---|---|
| 2010/0294804 | A1* | 11/2010 | Dalchau | B67D 1/0014 222/146.1 |
| 2010/0305903 | A1* | 12/2010 | Sharpe | G04F 10/00 702/176 |
| 2012/0312045 | A1* | 12/2012 | Kim | F25B 7/00 62/238.6 |
| 2019/0360183 | A1* | 11/2019 | Vetterli | F24H 1/121 |

FOREIGN PATENT DOCUMENTS

| | | |
|---|---|---|
| CN | 205493559 U | 8/2016 |
| CN | 102389262 B | 2/2017 |
| WO | WO 03/064314 * 8/2003 | ............... B67D 1/00 |

* cited by examiner

*Primary Examiner* — David J Teitelbaum

(57) ABSTRACT

Disclosed is a temperature adjusting method for instant heating or cooling with an energy-saving water dispenser, the method including: installing a water dispenser, which includes a heating device, a control processor, etc.; coupling a water inlet to a tap water pipe and heating the water to 100° C., where the produced boiling water is split into two branches, one flows out from a high-temperature water outlet; the other branch flows through a preheater and performs heat exchange with cold water to achieve a temperature drop thus forming warm boiled water, which enters a refrigeration unit to be cooled to 5° C. When the user sets a single-time output water temperature and amount within an effective range, the control processor automatically matches the corresponding working mode and provides an accurate output according to the user-set single-time output water temperature and amount. There is further disclosed a water dispenser.

14 Claims, 5 Drawing Sheets

TEMPERATURE ADJUSTING METHOD FOR INSTANT HEATING OR COOLING WITH AN ENERGY-SAVING WATER DISPENSER AND WATER DISPENSER

CROSS-REFERENCE TO RELATED APPLICATIONS

The present application claims the priority of Chinese Patent Application No. 201910106205.0 filed on Feb. 1, 2019, the entire disclosures of which are hereby incorporated herein by reference.

TECHNICAL FIELD

The present disclosure relates to the field of water dispensers and energy-saving technologies, and more particularly relates to a temperature adjusting method for instant heating or cooling with an energy-saving water dispenser having a tap water source, and a water dispenser thereof.

BACKGROUND

Nowadays, water dispensers are mainly divided into two types: pure water source and tap water source. Pure water can be drunk without boiling, while tap water needs to be boiled and sterilized for a continuous period of time before drinking. The consumption habits of Chinese people pay special attention to this point.

When people boil tap water for drinking, they often have the following misunderstandings. First, the power is turned off immediately after the water boils. Second, the water is kept boiling for a long time after boiling. Third, the water is covered with a lid after boiling to continue boiling for another few minutes. The drinking water thus prepared is not the most beneficial to people's health. The correct way is to open the lid when the water is about to boil (80~90° C.), and after the water boils, keep boiling it for another two or three minutes, then turn off the power, so as to maximize the evaporation of organic pollutants in the water. However, if the water is boiling for too long, it will also cause the water to age and form harmful substances. In existing water dispensers, the water is often heated continuously for 24 hours, and the heating and boiling durations of the water output at each time cannot be precisely controlled. Thus, the water it provides is not the most beneficial to the health of the human body.

In most existing household and office water dispensers, the output water typically has two kinds of temperature, either hot or cold. Some better water dispensers have three kinds of temperature, including cold, warm, and boiling, but the water cannot be controlled to any temperature between cold water and boiling water. Furthermore, all the water in the water storage tank is heated or cooled, and it is not possible to precisely heat or cool a certain amount of output water to a certain temperature at a single time. This cannot satisfy people's increasingly rich and demanding lives. For example, the temperatures of drinking water required for brewing milk powder, green tea, and brewing coffee are 50° C., 80° C., and 90° C., respectively, which is not possible with most water dispensers.

In order to solve the above problems, some temperature-adjustable water dispensers have also been provided in the related art, such as a instant heating temperature-adjustable water dispenser disclosed in Chinese Patent Publication No. CN102389262, which can heat the output water to a required temperature in a short period of time. However, it can only use pure drinking water as its drinking water source, so the cost for long-term use is high, and because there is arranged a water storage tank, it has the risk of breeding bacteria and contaminating the drinking water when the water is not changed for a long time. Another example is a rapid cooling water dispenser disclosed in Chinese Patent Publication No. CN205493559, which uses a refrigeration device to directly rapidly cool the boiling water to a desired temperature. The refrigeration device includes a refrigerating chip or a compression refrigerating machine, which consumes a large amount of electric energy and so is not energy-saving. Furthermore, it also has a boiling water container, so there is also the risk of breeding bacteria and contaminating the drinking water when the water is not changed for a long time.

For places where the using people or using habits are relatively fixed such as offices, homes, coffee shops, etc., people would pose relatively strong personalized requirements and operational repeatability for the amount and temperature of the water the water dispenser outputs at a single time. For example, the temperatures required for brewing milk powder, green tea, and coffee are 50° C., 80° C., and 90° C., respectively, while the amount of a single output is generally 150 to 500 ml. However, the water dispensers in the related art all fail to take into consideration the amount and temperature of the water output at a single time, as well as the problem that what is most suitable for human health.

Therefore, the present disclosure uses tap water as the water source, the amount and temperature of the output water can precisely match the user's personalized requirements at a single time, and the output drinking water is most suitable for human health. Furthermore, it can achieve high efficiency, cleanness, and energy conservation, which is not possible with the water dispensers in the related art.

SUMMARY

In view of the above-mentioned deficiencies of the existing water dispensers, the present disclosure provides a temperature adjusting method for instant heating or cooling with an energy-saving water dispenser, which uses tap water as a water source and can make the amount and temperature of the output water can precisely match the user's personalized requirements at a single time, so that the output water is best for human health. In addition, it is efficient, clean, and energy-saving, and there is no need to set up storage tanks such as water storage tanks or boiling water tanks thus overcoming bacterial growth. After tap water enters the water dispenser pipeline, the preset single-time personalized output water temperature and amount can be achieved through internal heat exchange in a short period time. The output water is clean and healthy, the temperature and flow amount are accurate, and the energy saving effect is significant. There is also provided a water dispenser for implementing this temperature adjusting method for instant heating or cooling.

In order to achieve the above object, the present disclosure provides the following technical solutions.

There is provided a temperature adjusting method for instant heating or cooling with an energy-saving water dispenser, the temperature adjusting method including the following operations:

(1) Installing a water dispenser, the water dispenser including a water inlet, a water filter, a preheater, a flow meter, a heating device, and a water outlet connected in series through a pipeline; the water dispenser further including a control processor, and an evaporator, a compressor, an air-cooled condenser, an expansion valve, a manual valve F, an electric valve FD, a solenoid valve FC, and a temperature sensor W controlled by the control processor;

(2) Connecting the water inlet of the water dispenser to a tap water pipe, and then connecting the water filter, the preheater, and the flow meter to the heating device in sequence through the pipeline;

(3) Setting by the user a single-time output water temperature and amount within an effective range, and automatically selecting by the control processor a matching working mode with a build-in program according to the single-time output water temperature and amount set by the user, and then controlling various parts to operate according to the selected working mode;

(4) Heating, by the heating device, inflowing tap water to 100° C., where the water vapor generated by the heating is discharged from the exhaust port through the exhaust valve FC2, and the boiling water is split into two branches, one of which flows out from a high temperature outlet to directly provide high temperature boiling water for the user;

(5) Making the other branch flow through a hot water side passage of the preheater to perform heat exchange with cold water in a cold water side passage thus achieving a temperature drop while heating the cold water at the same time; where the warm boiled water coming out from the preheater enters the evaporative cooler to be cooled to 5° C. by a refrigeration unit comprising the evaporative cooler, the compressor, the air-cooled condenser, and the expansion valve;

(6) Automatically matching, by the control processor, a corresponding working mode using a built-in program according to the user-set single-time output water temperature and amount, and computing and controlling opening and closing durations as well as an opening degree of the electric valve FD1 to control a water flow rate and water flow amount making the flow amount measured by the flow meter be the corresponding preset flow amount, and making the tap water of the flow amount boil and continue boiling for a preset period of time, preferably 1 to 3 minutes, when flowing through the heating device, for fully softening, disinfection, and vaporization of organic matters;

(7) Controlling, by the control processor, the opening and closing durations as well as the opening degree of the electric valve FD1 according to the set flow amount value, to control the water flow rate thereby controlling the heating time of the water in the heating device to ensure the water boils and continues boiling for a set duration, while making the water amount output at a single time be the output water amount preset by the user, then controlling the heated water to be output through different pipelines, thereby enabling the temperature of the boiled drinking water to be adjustable in the range of 5 to 100° C. through the cooperation of the heating device, the preheater and the refrigeration unit, and enabling the boiled drinking water to be accurately output according to the user-set single-time output water amount and temperature.

There is further provided an energy-saving type temperature-adjustable water dispenser capable of instant heating and cooling that implements the above-mentioned temperature adjusting method, the water dispenser includes:

a water dispenser housing, in which there is arranged a control processor, a water inlet, a plurality of water outlets, a water filter, a preheater, a flow meter, a heating device, an evaporator, a compressor, an air-cooled condenser, an expansion valve, a manual valve F, an electric valve FD, a solenoid valve FC, and a temperature sensor W.

When the user sets a single-time output water temperature and output water amount within an effective range, the control processor controls an opening degree as well as opening and closing durations of the electric valve FD by a built-in program according to the user-set single-time output water temperature and amount, making the cumulative flow amount measured by the flow meter be the corresponding preset flow amount, and enabling the tap water to boil and continue boiling for a set duration when flowing through the heating device;

In the case where the pipeline length and the power of the heating device is determined, the control processor controls the opening degree as well as the opening duration of the electric valve FD according to the preset temperature and flow amount value, making the amount of water flowing into the heating device 5 to boil be the set output water amount, and through the organic combination of the heating device, the preheater and the refrigeration unit, enabling the drinking water output at a single time to be adjustable in the temperature range of 5 to 100° C., the amount range of 150 to 2000 ml, and the boiling duration range of 1 to 3 minutes.

This disclosure provides the following beneficial effects.

The present disclosure provides a temperature adjusting method for instant heating or cooling with an energy-saving water dispenser, which uses tap water as a water source, and so is convenient to use and low in cost. The present disclosure adopts instant heating and cooling temperature adjustment to achieve the direct boiling and temperature adjustment of the drinking water through pipelines, without needing to set up a special water storage tank. The present disclosure enables a certain amount of tap water as required to flow into the water dispenser, and precisely adjusts the temperature after heating and boiling and then directly outputs the drinking water, so as to prevent water from staying in the pipeline. The present disclosure can enable the drinking water output at a single time to be adjustable in the temperature range of 5 to 100° C. as well as in the amount range of 150 to 2000 ml by the organic combination of the control processor, the heating device, the preheater and the refrigeration unit, thereby fully satisfying people's personalized drinking requirements. In the case where the pipeline length and the power of the heating device are determined, the control processor controls the opening degree as well as the opening duration of the electric valve FD1 according to the user-preset temperature and flow amount value, so as to enable the amount of the water flowing into the heating device to boil in a single time be the set output water amount, and then controls the water flow rate in the pipeline to make the boiling duration of the water flow in the pipeline be adjustable in the range of 1 to 3 minutes. The present disclosure can reduce the energy consumption of the heating device and the refrigeration unit by setting the preheater to recover the waste heat, thereby achieving energy saving and emission reduction.

According to the energy-saving water dispenser capable of instant heating and cooling that is provided by the present disclosure, the tap water after entering the pipeline of the water dispenser can reach the preset single-time personalized output water temperature and amount as well as boiling duration by way of heat exchange inside the pipeline in a short period time. Furthermore, the output water is clean, accurate with significant energy-saving effects. It can meet people's personalized drinking water requirements for the water dispenser including a single-time output amount, temperature, health, cleanness, in places where the using people or the using habits are relatively fixed such as offices, homes, coffee shops, etc.

BRIEF DESCRIPTION OF THE ACCOMPANYING DRAWINGS

Figure 1:
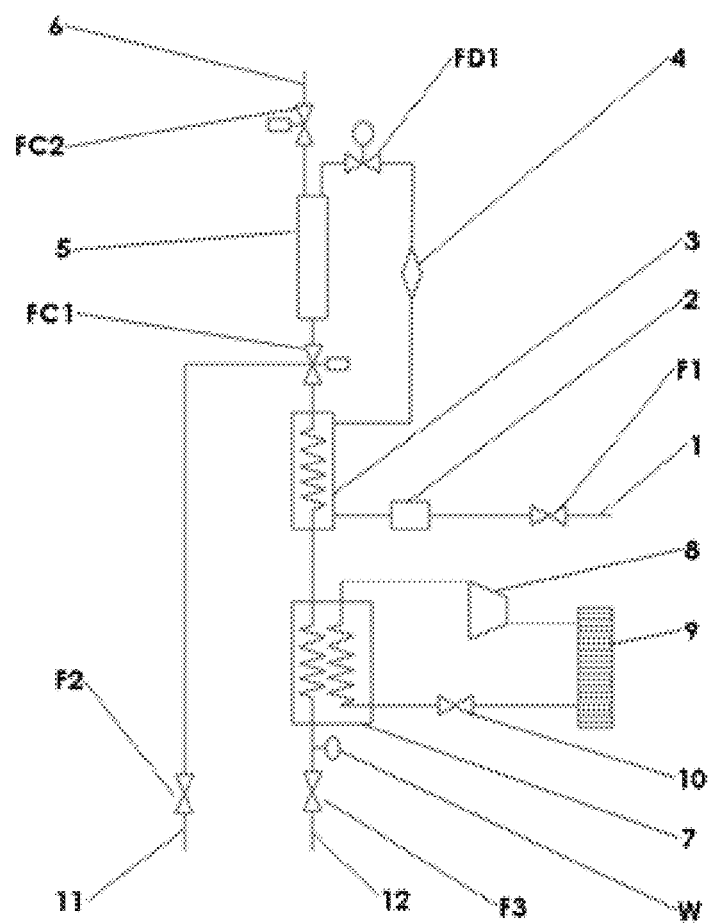
FIG. 1 is a schematic diagram illustrating an overall principle of the present disclosure.

In the drawings: 1, Water Inlet; 2, Water Filter; 4, Flow Meter; 5, Heating Device; 6, Exhaust Port; 7, Evaporator; 8, Compressor; 9, Air-cooled Condenser; 10, Expansion Valve; 11, High Temperature Water Outlet; 12, Medium Temperature Water Outlet; 32, Cold Water Outlet; F1-F3, Manual Valves; FD, Electric Valve; FC1-FC2, Solenoid Valves; W, Temperature Sensor; 3, Preheater; 33, Hot Water Inlet; 34, Hot Water Outlet; 31, Cold Water Inlet; 32, Cold Water Outlet; 7, Evaporative Cooler; 71, Inflow Port; 72, Outflow Port; 73, Refrigerant Inflow Port; 74, Refrigerant Outflow Port. 75, Hot Water Cooling Coil; 76, Evaporation Coil; 77, Housing; 78, Insulation Layer.

DETAILED DESCRIPTION OF ILLUSTRATIVE EMBODIMENTS

Technical solutions reflected in the embodiments according to this disclosure will now be described in a clear and complete manner in connection with the accompanying drawings intended for these embodiments.

Embodiment

Figure 2:
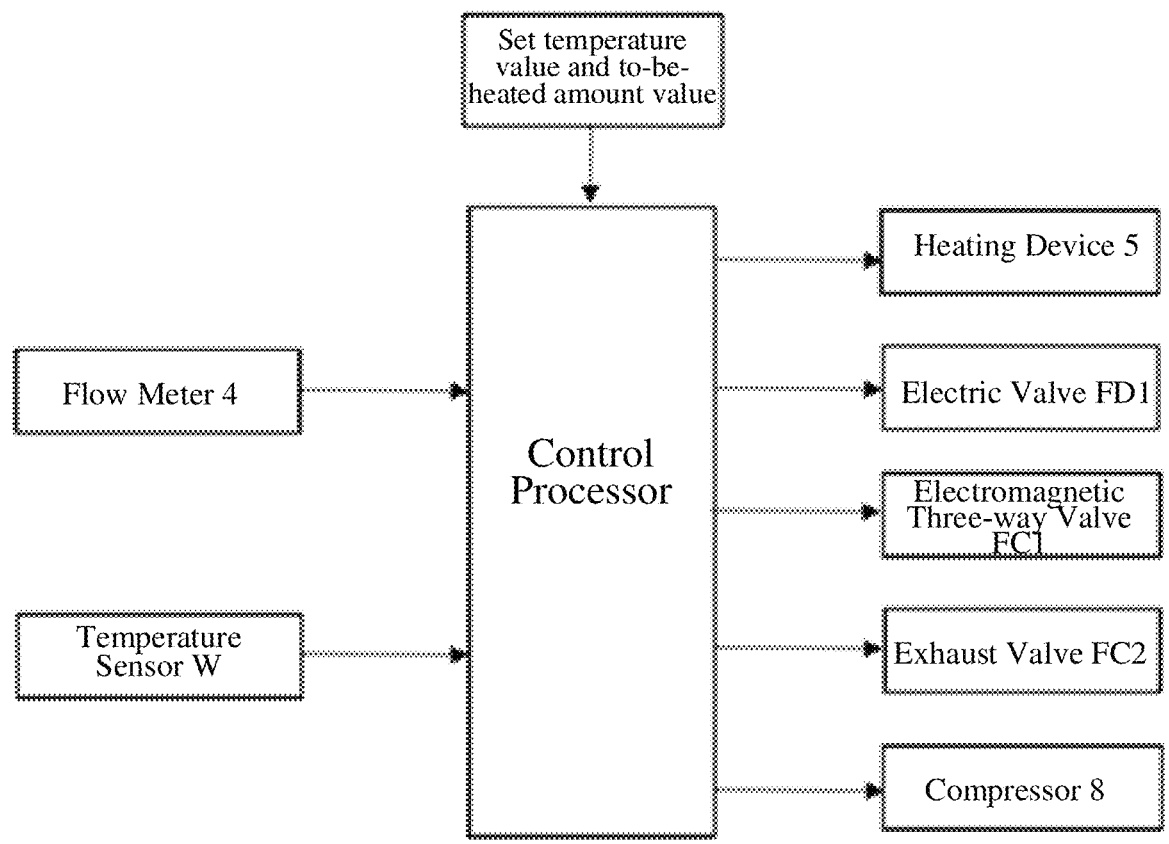
FIG. 2 is a block diagram illustrating the present disclosure.
Figure 3:
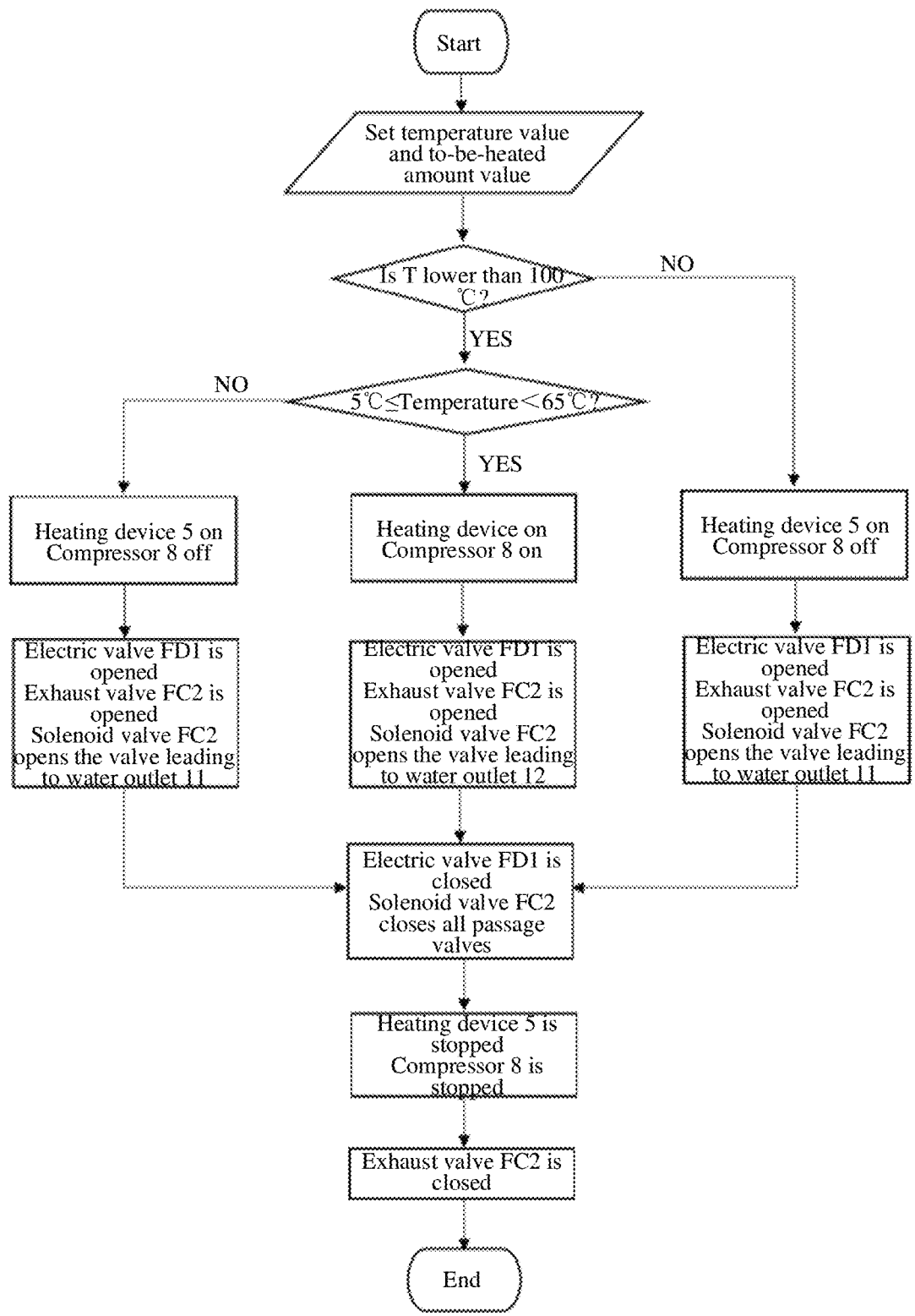
FIG. 3 is a control flow chart illustrating a temperature adjusting method according to the present disclosure.
Figure 4:
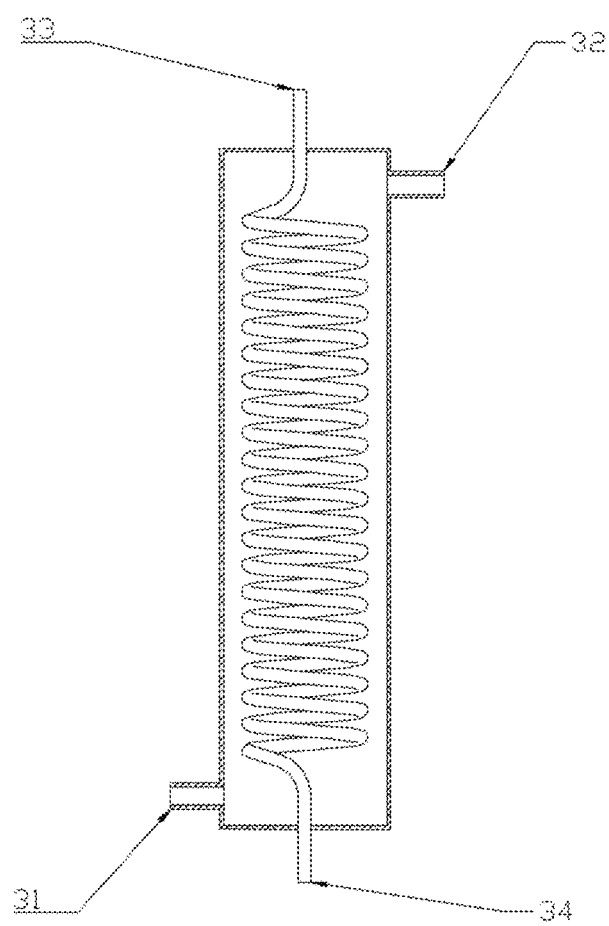
FIG. 4 is a schematic diagram illustrating a preheater according to the present disclosure.
Figure 5:
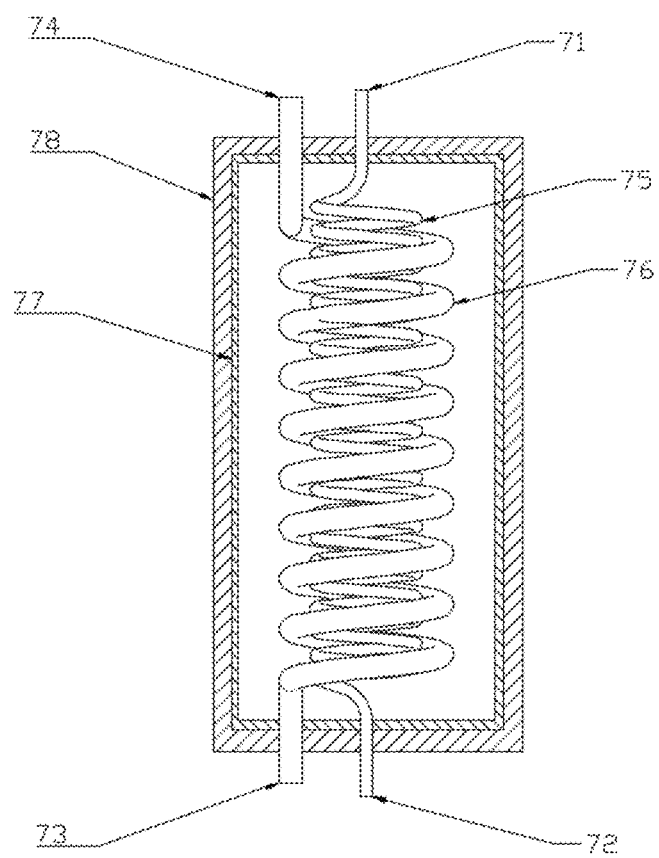
FIG. 5 is a schematic diagram illustrating an evaporative cooler according to the present disclosure.

Referring to FIG. 1 to FIG. 5, there is provided a temperature adjusting method for instant heating or cooling with an energy-saving water dispenser, which includes the following operations:

(1) A water dispenser is installed, which includes a water inlet 1, a water filter 2, a preheater 3, a flow meter 4, a heating device 5 and a water outlet connected in series through a pipeline. The water dispenser further includes a control processor, and an evaporator 7, a compressor 8, an air-cooled condenser 9, an expansion valve 10, a manual valve F, an electric valve FD, a solenoid valve FC, and a temperature sensor W controlled by the control processor.

(2) The water inlet 1 of the water dispenser is connected to a tap water pipe, and then the water filter 2, the preheater 3, and the flow meter 4 are connected to the heating device 5 in sequence through the pipeline.

(3) The user sets a single-time output water temperature and amount within an effective range, and then the control processor automatically matches a corresponding working mode using a build-in program according to the single-time output water temperature and amount set by the user, and then controls various parts to operate according to the selected working mode;

(4) The heating device 5 heats inflowing tap water to 100° C., where the water vapor generated by the heating is discharged from the exhaust port 6 through the exhaust valve FC2, and the boiling water is split into two branches, one of which flows out from a high temperature outlet 11 to directly provide high temperature boiling water for the user.

(5) The other branch is made to flow through a hot water side passage of the preheater 3 to perform heat exchange with the cold water in a cold water side passage thus achieving a temperature drop while heating the cold water at the same time; where the warm boiled water coming out from the preheater 3 enters the evaporative cooler 7 to be cooled to 5° C. by a refrigeration unit comprising the evaporative cooler 7, the compressor 8, the air-cooled condenser 9, and the expansion valve 10.

(6) The control processor automatically matches a corresponding working mode using a built-in program according to the user-set single-time output water temperature and amount, and computes and controls opening and closing durations as well as an opening degree of the electric valve FD1 to control a water flow rate and water flow amount making the flow amount measured by the flow meter 4 be the corresponding preset flow amount, and making the tap water of the flow amount boil and continue boiling for a preset period of time when flowing through the heating device 5, for fully softening, disinfection, and vaporization of organic matters, thereby make the output drinking water beat suitable for people's health;

(7) The control processor controls the opening and closing durations as well as the opening degree of the electric valve FD1 according to the set flow amount value, to control the water flow rate thereby controlling the heating time of the water in the heating device 5 to ensure the water boils and continues boiling for a set duration, while making the water amount output at a single time be the output water amount preset by the user, then controls the heated water to be output through different pipelines, thereby enabling the temperature of the boiled drinking water to be adjustable in the range of 5 to 100° C. through the cooperation of the heating device 5, the preheater 3 and the refrigeration unit, and enabling the boiled drinking water to be accurately output according to the user-set single-time output water amount and temperature.

In the above operation (5), the water dispenser has three working modes, which are automatically matched by the control processor according to the user-set flow amount and output temperature, and then the control processor controls the various parts to do the following operations:

(1) High temperature boiled water output mode: the heating device 5 is turned on while the preheater 3 doesn't perform heat exchange and the refrigeration unit stays idle;

(2) Medium and high temperature boiled water output mode: the heating device 5 is turned on while the preheater 3 performs heat exchange and the refrigeration unit stays idle;

(3) Medium and low temperature boiled water output mode: the heating device 5 is turned on while the preheater 3 performs heat exchange and the refrigeration unit is turned on.

The specific working process in each working mode are as follows:

(51) High-temperature boiled water output mode. When the user sets the output water temperature to Wc=100° C. with the temperature button and sets the output water amount to Lc1 with the amount button, and then presses the temperature button and the amount button and further manually opens the valve F2 to trigger a switch that sets the water dispenser to start working, the control processor automatically selects the matching high-temperature boiled water output mode to be enabled, and then sets the heating device 5 into operation according to the user-set single-time output water temperature and output water amount. In the case that the pipeline length and the power of the heating device are determined, the opening degree as well as opening and closing durations of the electric valve FD1 are controlled by a built-in program in order that the cumulative flow amount measured by the flow meter 4 is the corresponding preset flow amount Lc1 thereby ensuring that the tap water is able to boil and continue boiling for the set duration when flowing through the heating device 5 and that the amount is the set output water amount Lc1. Meanwhile, the exhaust valve FC2 is opened, and the solenoid three-way valve FC1 opens the valve leading to the high temperature water outlet 11 of the water dispenser, and closes the valve leading to the medium and low temperature water outlet 12 of the water dispenser, at which time the refrigeration unit stays idle. The boiled water is discharged from the high temperature water outlet 11 of the water dispenser. After the electric valve FD1 is closed, the exhaust valve FC2 is closed after being delayed for a set time. During this period of time, since the exhaust valve FC2 is in an open state, the boiling water passage in the heating device 5 is open to the atmosphere, and the boiling water in the boiling water passage totally flows out under the action of gravity to prevent bacteria from being trapped in the flow passage which otherwise would lead to growth of bacteria. It can also avoid affecting the temperature and flow amount of the water output at the next time.

(52) Medium-high temperature boiled water mode. When the user sets the output water temperature to 65° C.≤Wc<100° C. with the temperature button and sets the output water amount to Lc2 with the amount button, and then presses the temperature button and the amount button and further manually opens the valve F3 to trigger a switch that sets the water dispenser to start working, the medium-high temperature boiled water mode is enabled. The control processor then sets the heating device 5 into operation according to the user-set output water temperature and output water amount Lc2. In the case that the pipeline length and the power of the heating device 5 are determined, the opening degree as well as opening and closing durations of the electric valve FD1 are controlled by a built-in program in order that the cumulative flow amount measured by the flow meter 4 is the corresponding preset flow amount Lc2 thereby ensuring that the tap water is able to boil and continue boiling for the set duration when flowing through the heating device 5. Meanwhile, the exhaust valve FC2 is opened, and the solenoid three-way valve FC1 opens the valve leading to the medium and low temperature water outlet 12 of the water dispenser, and closes the valve leading to the high temperature water outlet 11 of the water dispenser, at which time the refrigeration unit is made to stay idle. The boiling water is made to flow through the hot water flow passage of the heat exchanger 3, and performs heat exchange with the cold water in the cold water flow passage, after which the temperature of the boiling water drops to the set output water temperature to form warm boiled water. Then it flows through the evaporative cooler 7 and further flows out of the medium and low temperature outlet 12 of the water dispenser. After the electric valve FD1 is closed, the exhaust valve FC2 is closed after being delayed for a set time. During this period of time, since the exhaust valve FC2 is in an open state, the boiling water passage in the heating device 5 is open to the atmosphere, and the water in the boiling water passage totally flows out under the action of gravity thereby preventing bacteria from being trapped and therefore breeding in the flow passage. It can also avoid affecting the temperature and flow amount of the water output at the next time.

Tests have shown that when the user sets the temperature to 65° C., the preheater 3 can reach the maximum heat exchange amount with the best energy saving effect regarding different output water amounts. Also, the output drinking water at 65° C. is also the drinking water temperature people most commonly use.

(53) Medium and low temperature boiled water mode. When the user sets the temperature to 5° C.≤Wc<65° C. with the temperature button and sets the output water amount to Lc3 with the amount button, and then presses the temperature button and the amount button and further manually opens the valve F3 to trigger a switch that sets the water dispenser to start working, the medium and low temperature boiled water mode is enabled. The control processor then sets the heating device 5 into operation according to the user-set output water temperature and output water amount Lc3. In the case that the pipeline length and the power of the heating device 5 are determined, the control processor controls the opening degree as well as the opening and closing durations of the electric valve FD1 in accordance with the programming according to the user-set output water temperature and output water amount, in order that the flow amount measured by the flow meter 4 is the corresponding preset flow amount Lc3 thereby ensuring that the tap water is able to boil and continue boiling for the set duration when flowing through the heating device 5. Meanwhile, the exhaust valve FC2 is opened, and the solenoid three-way valve FC1 opens the valve leading to the medium and low temperature water outlet 12 of the water dispenser, and closes the valve leading to the high temperature water outlet 11 of the water dispenser, at which time the refrigeration unit is started to operate. The refrigeration unit changes the power of the refrigeration compressor through variable frequency technology to achieving different refrigeration capacities thereby enabling the outlet water temperature to be adjustable within a range of 5° C. to 65° C. At this point, the boiled water flows through the hot water flow passage of the heat exchanger 3 and performs heat exchange with the cold water in the cold water flow passage, after which the temperature of the boiled water drops to 65° C. to form warm boiled water. Then it flows through the evaporative cooler 7 to be cooled to the set temperature and further flows out of the medium and low temperature outlet 12 of the water dispenser. After the electric valve FD1 is closed, the exhaust valve FC2 is closed after being delayed for a set time. During this period of time, since the exhaust valve FC2 is in an open state, the boiling water passage in the heating device 5 is open to the atmosphere, and so the water in the flow passage communicating with the boiling water passage totally flows out under the action of gravity thereby preventing bacteria from being trapped and therefore breeding in the flow passage. It can also avoid affecting the temperature and flow amount of the water output at the next time.

The operation (3) further includes the following operations.

The heating device 5 is composed of (N+1) electric heating film heating tubes, where the first N are vertically arranged and connected in series, and then connected in parallel with the (N+1)th electric heating film heating tube, where N≥3; in this embodiment, N=4. The electric heating film heating tubes are all of an overflow type design, so that the water entering each heating film heating tube flows from bottom to top. By controlling the flow rate at the water inlet and the total length of the electric heating film heating tubes, the heating time of the water in the electric heating film heating tubes can be controlled to ensure that the tap water boils at the Nth electric heating film heating tube, and then continues boiling at the (N+1) electric heating film heating tube, and then further overflows into the boiling water passage in the heating device 5. Then under the action of gravity, the boiling water flows out of the boiling water passage and leaves the heating device 5. Thus, the water is allowed to boil for a required continuous period of time, achieving the purpose of disinfection and softening.

In this embodiment, the heating device 5 comprises specifically five electric heating film heating tubes with a power of 600 W, the total power being 3000 W. The first four are connected in series which are connected with the fifth in parallel so that the water entering the electric heating film heating tubes would have been boiled before entering the fifth electric heating film heating tube. This ensures that the water is boiling at the time of flowing out of the fifth electric heating film heating tube.

The operation (6) further includes the following operations.

(61) In the case where the pipeline length and the power of the heating device is determined, the control processor controls the opening degree as well as the opening duration of the electric valve FD according to the preset temperature and flow amount value, making the amount of water flowing into the heating device 5 to boil be the set output water amount, and through the organic combination of the heating device 5, the preheater 3 and the refrigeration unit, enabling the drinking water output at a single time to be adjustable in the temperature range of 5 to 100° C., the amount range of 150 to 2000 ml, and the boiling duration range of 1 to 3 minutes. Thus, the tap water is fully softened, disinfected, and the organic matters are effectively volatilized, so that the output drinking water is most beneficial to people's health.

There is further provided an energy-saving temperature-adjustable water dispenser capable of instant heating and cooling that implements the above-mentioned method, the water dispenser includes:

a water dispenser housing, in which there is provided: a control processor, a water inlet, a plurality of water outlets, a water filter 2, a preheater 3, a flow meter 4, a heating device 5, an evaporator 7, a compressor 8, and air-cooled condenser 9, an expansion valve 10, a manual valve F, an electric valve FD, a solenoid valve FC, and temperature sensor W;

where the water inlet 1 of the water dispenser is connected to a tap water pipe, and then the water filter 2, the preheater 3, and the flow meter 4, and the heating device 5 are connected with each other in sequence through a pipeline;

the heating device 5 heats the water to 100° C., during which the water vapor generated is discharged from the exhaust port 6 through the exhaust valve FC2; the boiling water is then split into two branches, one of which flows out from the high-temperature water outlet 11 to directly provide high-temperature boiling water for the user;

the other branch flows through a hot water side passage of the preheater 3 to perform heat exchange with the cold water in a cold water side passage thus achieving a temperature drop while heating the cold water at the same time, forming warm boiled water; the warm boiled water coming out from the preheater 3 enters the evaporative cooler 7 to be cooled to 5° C. by a refrigeration unit comprising the evaporative cooler 7, the compressor 8, the air-cooled condenser 9, and the expansion valve 10;

when the user sets a single-time output water temperature and output water amount within an effective range, the control processor controls an opening degree as well as opening and closing durations of the electric valve FD by a built-in program according to the user-set single-time output water temperature and amount, making the cumulative flow amount measured by the flow meter 4 be the corresponding preset flow amount, and enabling the tap water to boil and continue boiling for a set duration when flowing through the heating device 5;

in the case where the pipeline length and the power of the heating device is determined, the control processor controls the opening degree as well as the opening duration of the electric valve FD according to the preset temperature and flow amount value, making the amount of water flowing into the heating device 5 to boil be the set output water amount, and through the organic combination of the heating device 5, the preheater 3 and the refrigeration unit, enabling the drinking water output at a single time to be adjustable in the temperature range of 5 to 100° C., the amount range of 150 to 2000 ml, and the boiling duration range of 1 to 3 minutes.

The preheater 3 is composed of a spiral coil and a casing.

The boiling water flows into the spiral coil from the hot water inlet 33 and flows out from the hot water outlet 34. This ensures that the boiling water completely flows out of the flow passage under the action of gravity. The cold water flows in from the cold water inlet 31 and flows out from the cold water outlet 32.

The evaporative cooler 7 is a closed space formed by a hot water cooling coil 75, an evaporation coil 76, a casing 77, and a heat insulating layer 78, filled with nitrogen or dry air. Hot water flows from port 71 into hot water cooling coil 75 and then flows out of port 72. The refrigerant of the refrigeration unit enters and exits the evaporator coil 76 from port 73 and then exits from port 74.

The water dispenser housing is further provided with four temperature setting shortcut buttons, four amount setting shortcut buttons, and one continuous boiling time setting shortcut button, so that the user can set a single-time output water temperature, output water amount, and continuous boiling time within an effective range.

Each of the shortcut buttons described above can be customized. The user can set three temperature buttons and three amount buttons as frequently used buttons according to his habits, while the remaining one temperature button and one amount button can be set or changed according to actual needs.

When the user presses a certain temperature button and a certain amount button and manually opens the valve F2 or F3, the switch that sets the water dispenser into operation would be triggered, and the water dispenser would enable the corresponding working mode and output the drinking water with the corresponding temperature, amount, and set continuous boiling duration at the single time.

The control processor according to the present disclosure can be implemented as a PLC controller in the related art, which has a corresponding control program built therein to control the operation of various parts. Various components such as the solenoid valve and the like can also be implemented as the mature products in the related art according to the effects to be achieved by the present disclosure, which however will not be described in detail herein.

The foregoing embodiments are merely some illustrative embodiments according to the present disclosure, and are not intended to limit the present disclosure in any form. Any person skilled in the art would be able to make numerous possible variations and modifications to the technical solutions of the present disclosure taking advantage of the methods and technical contents disclosed above, or modify them to be equivalent implementations with equivalent changes without departing from the scope of the technical solutions of the present disclosure. Therefore, the equivalent changes made based on the shapes, arrangements, and principles of the present disclosure without departing from the technical solutions of the present disclosure shall all fall in the protective scope covered by the present disclosure.

What is claimed is:

1. A temperature adjusting method for instant heating or cooling with an energy-saving water dispenser, the water dispenser comprising a water inlet, a water filter, a preheater, a flow meter, a heating device, a medium and low temperature water outlet, and a high temperature water outlet that are connected in series through a pipeline, the water dispenser further comprising a control processor, and an evaporator, a compressor, an air-cooled condenser, an expansion valve, a manual valve F, an electric valve FD, a solenoid valve FC, and a temperature sensor W that are controlled by the control processor, the temperature adjusting method comprising:

S1: coupling the water inlet of the water dispenser to a tap water pipe, and connecting the water filter, the preheater, and the flow meter to the heating device in sequence through the pipeline;

S2: setting, by a user, a single-time output water temperature and output water amount within an effective range, and automatically selecting, by the control processor, a corresponding matching working mode using a built-in program according to the user-set single-time output water temperature and output water amount, and controlling the water dispenser to operate according to the selected working mode;

S3: heating, by the heating device, inflowing tap water to 100° C., where water vapor produced by the heating is discharged from an exhaust port through an exhaust valve FC2, and the boiling water is split into two branches, one of which flows out from a high temperature outlet to directly provide high temperature boiling water for the user;

S4: making the other branch flow through a boiled water side passage of the preheater to perform heat exchange with unboiled water in a unboiled water side passage thus achieving a temperature drop and form warm boiled water, while heating the unboiled water at the same time; where the warm boiled water coming out from the preheater enters the evaporative cooler to be cooled by a refrigeration unit comprising the evaporative cooler, the compressor, the air-cooled condenser, and the expansion valve;

S5: automatically selecting, by the control processor, a corresponding matching working mode using the built-in program according to the user-set single-time output water temperature and output water amount, and computing and controlling opening and closing durations as well as an opening degree of the electric valve FD1 to control a water flow rate and water flow amount making a flow amount measured by the flow meter be the corresponding preset output water amount, and making the tap water of the output water amount boil and continue boiling for a preset period of time when flowing through the heating device; and S6: controlling, by the control processor, the opening and closing durations as well as the opening degree of the electric valve FD1 according to a set flow amount value, to control the water flow rate thereby controlling a heating time of the water in the heating device to ensure the water boils and continues boiling for a set time, while making the water amount output at a single time be the output water amount preset by the user, then controlling the heated water to be output through different pipelines, thereby enabling the temperature of the boiled drinking water to be adjustable through cooperation of the heating device, the preheater and the refrigeration unit, and enabling the boiled drinking water to be accurately output according to the user-set single-time output water amount and temperature.

2. The temperature adjusting method of claim 1, wherein the operation S4 further comprises:

the water dispenser has three working modes, which are automatically selected by the control processor according to the user-set output water amount and output water temperature, and the control processor controls the water dispenser to perform the following operations:

high temperature boiled water output mode: the heating device is operating while the preheater does not perform heat exchanger and the refrigeration unit stays idle;

medium and high temperature boiled water output mode: the heating device is started to operate while the preheater performs heat exchange and the refrigeration unit stays idle;

medium and low temperature boiled water output mode: the heating device is started to operate while the preheater performs heat exchange and the refrigeration unit is started to operate.

3. The temperature adjusting method of claim 2, wherein the operation S4 comprises:

S51: high-temperature boiled water output mode: when the user sets the output water temperature to Wc=100° C. using a temperature button and sets the output water amount to Lc1 using an amount button, and presses the temperature button and the amount button and manually opens valve F2 to trigger a switch that sets the water dispenser to start working, the control processor automatically selects the matching high-temperature boiled water output mode to be enabled, and sets the heating device into operation according to the user-set single-time output water temperature and output water amount: in the case that a pipeline length and a power of the heating device are determined, the opening degree as well as opening and closing durations of the electric valve FD1 are controlled by a built-in program in order that a cumulative flow amount measured by the flow meter is the corresponding preset output water amount Lc1 thereby ensuring that the tap water is able to boil and continue boiling for a set duration when flowing through the heating device and that the amount is the set output water amount Lc1; meanwhile the exhaust valve FC2 is opened, and the solenoid three-way valve FC1 opens a valve leading to the high temperature water outlet of the water dispenser, and closes a valve leading to the medium and low temperature water outlet of the water dispenser, at which time the refrigeration unit stays idle; the boiled water is discharged from the high temperature water outlet of the water dispenser; after the electric valve FD1 is closed, the exhaust valve FC2 is closed after being delayed for a set time; during this period of time, since the exhaust valve FC2 is in an open state, a boiling water passage in the heating device is open to the atmosphere, and the boiling water in the boiling water passage totally flows out under the action of gravity to prevent bacteria from being trapped and therefore growing in the flow passage, which also avoids affecting the temperature and flow amount of water output at a next time.

4. The temperature adjusting method of claim 2, wherein the operation S4 further comprises:

S52: when the user sets the output water temperature to 65° C.<Wc<100° C. using a temperature button and sets the output water amount to Lc2 using an amount button, and presses the temperature button and the amount button and manually opens valve F3 to trigger a switch that sets the water dispenser to start working, the medium-high temperature boiled water mode is enabled, the control processor sets the heating device into operation according to the user-set output water temperature and output water amount Lc2; in the case that a pipeline length and a power of the heating device are determined, the opening degree as well as opening and closing durations of the electric valve FD1 are controlled by a built-in program in order that a cumulative flow amount measured by the flow meter is the corresponding preset output water amount Lc2 thereby ensuring that the tap water is able to boil and continue boiling for the set duration when flowing through the heating device; meanwhile, the exhaust valve FC2 is opened, and the solenoid three-way valve FC1 opens a valve leading to a medium and low temperature water outlet of the water dispenser, and closes a valve leading to the high temperature water outlet of the water dispenser, at which time the refrigeration unit stays idle; the boiling water is made to flow through a boiled water flow passage of the heat exchanger, and performs heat exchange with unboiled water in a unboiled water flow passage, after which the temperature of the boiling water drops to the set output water temperature to form warm boiled water, which flows through the evaporative cooler and further flows out of the medium and low temperature outlet of the water dispenser; after the electric valve FD1 is closed, the exhaust valve FC2 is closed after being delayed for a set time; during this period of time, since the exhaust valve FC2 is in an open state, the boiling water passage in the heating device is open to the atmosphere, and the water in the boiling water passage totally flows out under the action of gravity thereby preventing bacteria from being trapped and therefore breeding in the flow passage, which also avoids affecting the temperature and flow amount of water output at a next time.

5. The temperature adjusting method of claim 2, wherein the operation S4 further comprises:
S53: medium and low temperature boiled water mode: when the user sets the temperature to 5° C.<Wc<65° C. using a temperature button and sets the output water amount to Lc3 using an amount button, and presses the temperature button and the amount button and manually opens the valve F3 to trigger a switch that sets the water dispenser to start working, the medium and low temperature boiled water mode is enabled; the control processor sets the heating device into operation according to the user-set output water temperature and output water amount Lc3; in the case that a pipeline length and a power of the heating device are determined, the control processor controls the opening degree as well as opening and closing durations of the electric valve FD1 in accordance with programming according to the user-set output water temperature and output water amount, in order that a flow amount measured by the flow meter is the corresponding preset flow amount Lc3 thereby ensuring that the tap water is able to boil and continue boiling for the set duration when flowing through the heating device; meanwhile, the exhaust valve FC2 is opened, and the solenoid three-way valve FC1 opens a valve leading to the medium and low temperature water outlet of the water dispenser, and closes a valve leading to the high temperature water outlet of the water dispenser, at which time the refrigeration unit is started to operate which changes a power of the refrigeration compressor through variable frequency technology to achieving different refrigeration capacities thereby enabling outlet water temperature to be adjustable within a range of 5° C. to 65° C.; at this point, the boiled water flows through a boiled water flow passage of the heat exchanger and performs heat exchange with unboiled water in a unboiled water flow passage, after which the temperature of the boiled water drops to 65° C. to form warm boiled water, which flows through the evaporative cooler to be cooled to the set temperature and further flows out of the medium and low temperature outlet of the water dispenser; after the electric valve FD1 is closed, the exhaust valve FC2 is closed after being delayed for a set time, and during this period of time, since the exhaust valve FC2 is in an open state, the boiling water passage in the heating device is open to the atmosphere, and the water in the flow passage communicating with the boiling water passage totally flows out under the action of gravity thereby preventing bacteria from being trapped and therefore breeding in the flow passage; it also avoids affecting the temperature and flow amount of the water output at a next time.

6. The temperature adjusting method of claim 1, wherein the operation S2 further comprises:
the heating device is comprised of (N+1) electric heating film heating tubes, wherein the first N are vertically disposed and connected in series, which are then connected in parallel with the (N+1)th electric heating film heating tube, where N≥3; the electric heating film heating tubes are all overflow heating tubes, so that water entering each heating film heating tube flows from bottom to top, and by controlling a flow rate at the water inlet and a total length of the electric heating film heating tubes, a heating time of the water in the electric heating film heating tubes is controlled to ensure that the tap water boils at the Nth electric heating film heating tube, and then continues boiling at the (N+1) electric heating film heating tube, and further overflows into the boiling water passage in the heating device; under the action of gravity, the boiling water flows out of the boiling water passage and leaves the heating device, so that the water is allowed to boil for a required continuous period of time, achieving the purpose of disinfection and softening.

7. The temperature adjusting method of claim 1, wherein the operation S5 further comprises:
S61: in the case where a pipeline length and a power of the heating device are determined, the control processor controls the opening degree as well as an opening duration of the electric valve FD1 according to the preset output water temperature and output water amount value, making an amount of water flowing into the heating device to boil be the set output water amount, and through a combination of the heating device, the preheater and the refrigeration unit, enabling the drinking water output at a single time to be adjustable in the temperature range of 5 to 100° C., the amount range of 150 to 2000 ml, and the boiling duration range of 1 to 3 minutes so that the tap water is fully softened, disinfected, and the organic matters are effectively volatilized.

8. An energy-saving temperature-adjustable water dispenser capable of instant heating and cooling that implements the temperature adjusting method of claim 1, the water dispenser comprising:
    a water dispenser housing, in which there is arranged the control processor, the water inlet, a plurality of water outlets, the water filter, the preheater, the flow meter, the heating device, the evaporator, the compressor, the air-cooled condenser, the expansion valve, the manual valve F, the electric valve FD, the solenoid valve FC, and the temperature sensor W;
    wherein the water inlet of the water dispenser is coupled to the tap water pipe, and the water filter, the preheater, the flow meter, and the heating device are connected with each other in sequence through a pipeline;
    the heating device heats the water to 100° C., during which the water vapor generated is discharged from an exhaust port through exhaust valve FC2; the boiling water is split into two branches, one of which flows out from the high temperature water outlet to directly provide high-temperature boiling water for a user;
    the other branch flows through the boiled water side passage of the preheater to perform heat exchange with unboiled water in the unboiled water side passage thus achieving a temperature drop while heating the unboiled water at the same time, forming warm boiled water; wherein the warm boiled water coming out from the preheater enters the evaporative cooler to be cooled by the refrigeration unit comprising the evaporative cooler, the compressor, the air-cooled condenser, and the expansion valve;
    when the user sets a single-time output water temperature and output water amount within an effective range, the control processor controls the opening degree as well as opening and closing durations of the electric valve FD by a built-in program according to the user-set single-time output water temperature and amount, making a cumulative flow amount measured by the flow meter be the corresponding preset flow amount, and enabling the tap water to boil and continue boiling for a set duration when flowing through the heating device;
    in the case where a pipeline length and a power of the heating device are determined, the control processor controls the opening degree as well as opening duration of the electric valve FD according to the preset output water temperature and output water amount value, making an amount of water flowing into the heating device to boil be the set output water amount, and through a combination of the heating device, the preheater and the refrigeration unit, enabling the drinking water output at a single time to be adjustable in a temperature range, an amount range, and a boiling duration range.

9. The energy-saving water dispenser of claim 8, wherein the preheater is comprised of a spiral coil and a casing, the boiling water flows into the spiral coil from a boiled water inlet and flows out from a boiled water outlet, so that the boiling water completely flows out of the flow passage under the action of gravity, while the unboiled water flows in from a unboiled water inlet and flows out from a unboiled water outlet.

10. The energy-saving water dispenser of claim 8, wherein the evaporative cooler is a closed space formed by a boiled water cooling coil, an evaporation coil, a casing, and a heat insulating layer, filled with nitrogen or dry air, wherein boiled water flows from a port into boiled water cooling coil and then flows out of a port, and a refrigerant of the refrigeration unit enters and exits the evaporator coil from a port and then exits from a port.

11. The temperature adjusting method of claim 1, wherein in operation S4, the warm boiled water coming out from the preheater enters the evaporative cooler to be cooled to 5° C. by the refrigeration unit, and in operation S6 the temperature of the boiled drinking water is adjustable in the range of 5° C. to 100° C. through the cooperation of the heating device, the preheater and the refrigeration unit.

12. The energy-saving water dispenser of claim 8, wherein the warm boiled water coming out from the preheater enters the evaporative cooler to be cooled to 5° C. by the refrigeration unit, and the temperature range in which the drinking water output at a single time is adjustable is 5° C. to 100° C.

13. The energy-saving water dispenser of claim 8, wherein the amount range in which the drinking water output at a single time is adjustable is 150 to 2000 ml.

14. The energy-saving water dispenser of claim 8, wherein the boiling duration range in which the drinking water output at a single time is adjustable is 1 to 3 minutes.

* * * * *